Patented Dec. 5, 1922.

1,437,618

UNITED STATES PATENT OFFICE.

CHARLES J. RUEHRWEIN, OF CINCINNATI, OHIO, ASSIGNOR OF ONE-FOURTH TO CARL J. ZUBE, ONE-FOURTH TO JOSEPH LAWSON, AND ONE-FOURTH TO WILLIAM REINKE, ALL OF CINCINNATI, OHIO.

COMPOSITION OF MATTER AND PROCESS FOR MAKING WATER-CLOSET TANKS AND LIDS AND WATER-CLOSET SEATS AND COVERS.

No Drawing. Application filed May 9, 1921. Serial No. 468,122.

*To all whom it may concern:*

Be it known that I, CHARLES J. RUEHRWEIN, a citizen of the United States, residing in Cincinnati, in the county of Hamilton and State of Ohio, have invented a certain new and useful Composition of Matter and Process for Making Water-Closet Tanks and Lids and Water-Closet Seats and Covers, of which the following is a specification.

The object of my invention is the rapid production of an economical structure which possesses great strength and durability, and which is substantially waterproof.

My composition consists of a mixture of distilled rosin, fine asbestos and long asbestos fibre.

My invention also consists in the process as herein set forth and claimed.

In preparing the composition, I prefer to use the ingredients in about the following proportions, viz: three pounds of distilled rosin, three pounds of fine asbestos and one-half pound of long asbestos fibre. Good results, however, may be obtained when the ingredients are varied within certain limits; as for example, ten pounds of distilled rosin, eleven pounds of fine asbestos and two pounds of long asbestos fibre may be used. The first example is preferably used for the structure in making the lids of the tanks and the second example is preferably used in making the body of the tanks. It will be understood, of course, that other variations in the ingredients may be made without departing from the scope or the spirit of my invention. The best results, however, seem to be obtained by following the proportions substantially as above set forth. While the structure is particularly well adapted for the construction of water closet tanks and lids and water closet seats and covers, it may also be applied in the manufacture of other structures.

My process consists in mixing distilled rosin, fine asbestos and long asbestos fibre together, placing it in a suitable receptacle and heating until the mixture forms a composition of the consistency somewhat similar to putty or bread dough after the same has been freshly worked ready for baking. The composition while in this state is placed in a suitable mold and formed into the desired shape under hydraulic pressure. The time required for the material to set and become perfectly hard is about two minutes. After the product has been thus formed, it is given a coating of shellac to prevent the finish which will be white, from turning yellow. After the shellac has set any suitable coating such as two coats of flat and a final coating of white enamel may be applied in making a white tank.

My composition is light, strong, durable and waterproof and possesses in a high degree all of the desired properties and qualities for the above purposes.

What I claim as new and desire to secure by Letters Patent, is:

1. A composition for the purposes set forth consisting of a mixture of ten pounds of distilled rosin, eleven pounds of fine asbestos, and two pounds of long asbestos fibre, substantially as set forth and for the purpose specified.

2. The herein described process which consists of heating distilled rosin, fine asbestos and long asbestos fibre and thoroughly mixing the same until it assumes the consistency of soft putty or dough, then while in a heated state placing said mixture or composition within a mold and compressing it and allowing it to cool and harden.

CHARLES J. RUEHRWEIN.